United States Patent
Olds

(10) Patent No.: US 12,273,803 B2
(45) Date of Patent: Apr. 8, 2025

(54) SATELLITE COMMUNICATION SYSTEM HAVING PRIMARY AND SECONDARY NEIGHBORHOOD EGRESS NODES

(71) Applicant: EAGLE TECHNOLOGY, LLC, Melbourne, FL (US)

(72) Inventor: Keith A. Olds, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 691 days.

(21) Appl. No.: 17/453,348

(22) Filed: Nov. 3, 2021

(65) Prior Publication Data
US 2023/0137047 A1    May 4, 2023

(51) Int. Cl.
| H04W 84/06 | (2009.01) |
| H04B 7/185 | (2006.01) |
| H04B 7/195 | (2006.01) |
| H04L 45/28 | (2022.01) |
| H04W 40/20 | (2009.01) |

(52) U.S. Cl.
CPC ........ *H04W 40/20* (2013.01); *H04B 7/18534* (2013.01); *H04B 7/195* (2013.01); *H04L 45/28* (2013.01)

(58) Field of Classification Search
None
See application file for complete search history.

(56) References Cited

U.S. PATENT DOCUMENTS

| 10,812,374 | B2 | 10/2020 | Heron et al. | |
| 2018/0131532 | A1* | 5/2018 | Wijnands | H04L 12/1845 |
| 2021/0092640 | A1* | 3/2021 | Ravishankar | H04L 47/6275 |
| 2023/0075345 | A1* | 3/2023 | Ravishankar | H04B 7/18521 |
| 2023/0421252 | A1* | 12/2023 | Akyildiz | B64G 1/1085 |

OTHER PUBLICATIONS

Chemouil et al., "Guest Editorial—Special Issue on Advances in Artificial Intelligence and Machine Learning for Networking," IEEE Journal on Selected Areas in Communications; vol. 38; No. 10; Oct. 2020; pp. 2229-2233.
Qi et al., "A Survey of Routing Techniques for Satellite Networks," Journal of Communications and Information Networks; vol. 1; No. 4; Dec. 2016; pp. 66-85.
(Continued)

*Primary Examiner* — Willie J Daniel, Jr.
(74) *Attorney, Agent, or Firm* — ALLEN, DYER, DOPPELT, + GILCHRIST, P.A.

(57) ABSTRACT

A satellite communication system includes satellite nodes moving in respective known orbits, and a controller configured to determine routing neighborhoods for each satellite node based upon the known orbits, each routing neighborhood comprising a group of adjacent satellite nodes; and assign a respective primary neighborhood egress node (NEN) from among the plurality of satellite nodes for each routing neighborhood. A given satellite node of a given satellite node routing neighborhood may be configured to reroute a failed path from a source satellite node to a destination satellite node through the given satellite neighborhood using a secondary NEN instead of a respective primary NEN.

22 Claims, 9 Drawing Sheets

(56) References Cited

OTHER PUBLICATIONS

Rusek et al., "RouteNet: Leveraging Graph Neural Networks for Network Modeling and Optimization in SDN," IEEE Journal on Selected Areas in Communications; arXiv:1910.01508v2; Jul. 9, 2020; pp. 1-12.

Zhang et al., "CFR-RL: Traffic Engineering With Reinforcement Learning in SDN," IEEE Journal on Selected Areas In Communications; vol. 38; No. 10; Oct. 2020; pp. 2249-2259; Abstract Only (1 page).

Zhang et al., "Destruction-Resistant Routing Strategy for GEO/LEO Double-Layer Satellite Networks," Periodical Office of Nanjing University of Posts and Telecommunications; Apr. 2018; Abstract Only; 1 page.

* cited by examiner

| | ADDRESS | 1<br>BYTES PER QS TABLE ENTRY | 2<br>NETWORK LOAD FOR QSR PER DAY | 3<br>AVERAGE QSR DATA RATE | 4<br>5 MINUTE GROUND PASS QSR DATA RATE FOR A NODE |
|---|---|---|---|---|---|
| a | CUSTOM | 3 | 782.3 MB | 72.4 KBPS | 20.9 KBPS |
| b | ETHERNET MAC WITHOUT OUI | 4 | 1043.2 MB | 96.6 KBPS | 27.8 KBPS |
| c | FULL ETHERNET MAC | 7 | 1825.5 MB | 169.0 KBPS | 48.7 KBPS |
| d | IPV4 | 5 | 1303.9 MB | 120.7 KBPS | 34.8 KBPS |
| e | IPV6 | 17 | 4433.3 MB | 410.5 KBPS | 118.2 KBPS |

SATELLITE COMMUNICATION SYSTEM HAVING PRIMARY AND SECONDARY NEIGHBORHOOD EGRESS NODES

GOVERNMENT LICENSE RIGHTS

This invention was made with government support under U.S. Government Contract PA Number 63U2-1200. The government has certain rights in the invention.

FIELD OF THE INVENTION

The present invention relates to the field of communication systems and, more particularly, to satellite communication systems having assigned routing neighborhoods.

BACKGROUND OF THE INVENTION

Non-geostationary satellites with inter-satellite links and space-to-ground and ground-to-space links move continuously, resulting in a constantly changing topology of satellite network connections. These satellites may be in ballistic orbits and many changes in the position of the orbiting satellites are predictable to aid inter-satellite communications. Terrestrial routing techniques may not be well suited for use with satellite networks since terrestrial networks have relatively static connectivity, e.g., wired networks, networks with static backbones, "last mile" mobile networks, such as in cellular systems, or ground networks such as ad-hoc systems.

To apply these terrestrial routing techniques in space may result in poor performance, loss of network communications efficiency, or both. Although there is a large amount of routing technology available for terrestrial networks, for satellite networks having inter-satellite communications, there are two primary routing approaches. In one example, terrestrial routing techniques may be directly applied using non-ad-hoc systems that require excessive overhead messages to maintain the dynamics of the inter-satellite communications. Ad-hoc techniques may operate better, but those systems fail to exploit the predictability of the constellation of moving satellites and thereby lose performance.

Some satellite communication systems determine routes based on predicted satellite locations and connections and periodically upload packet forwarding tables from a network operations center, such as a ground-based control center, based on modeled routes. Such a quasi-static routing system may have reduced robustness when unexpected changes occur in a satellite orbit or trajectory. There may be long recovery delays because of the centralized management of the satellites, and because localized routing decisions at the satellite itself are prone to routing loops and dropped packets. Satellite networks with no inter-satellite links may be limited to local connections, and any distributed ground stations on the earth may have limited store-and-forward data. That type of system also may require a massive ground infrastructure.

A non-geostationary satellite constellation that uses inter-satellite links and quasi-static routing scheme may result in a lost user data when there is a failure in the satellite link or an operational failure in a satellite, even a minor fault such as a delay in forming a planned link may result in loss of user data or unacceptable delay in data delivery. Systems may attempt rerouting by sending data on an alternate connection, but without knowledge of the full network topology, which is maintained at the network operations center such rerouting methods may create a routing loop. Any defective failure correction may require action by the satellite itself and by a network operations center, such as a ground-based control center, that would be required to upload new quasi-static routing tables to each satellite. An ad-hoc network routing system, however, would not be able to use quasi-static routing because the network node locations are not predictable, and for that reason, quasi-static routing is more applicable for space-based satellite networks because the satellite nodes are in known ballistic orbits. Use of segment routing, such as used in terrestrial networks, assumes fixed segments, and may not be as useful in space-based satellite networks where the satellites move relative to other satellites except in limited cases where some satellites are spaced around the same orbital plane.

SUMMARY OF THE INVENTION

In general, a satellite communication system may include a plurality of satellite nodes moving in respective known orbits, and a controller configured to determine a plurality of routing neighborhoods for each satellite node based upon the known orbits, each routing neighborhood comprising a group of adjacent satellite nodes. The controller may assign a respective primary neighborhood egress node (NEN) from among the plurality of satellite nodes for each routing neighborhood. A given satellite node of a given satellite node routing neighborhood may be configured to reroute a failed path from a source satellite node to a destination satellite node through the given satellite neighborhood using a secondary NEN instead of a respective primary NEN. Each satellite node may comprise at least one antenna, at least one wireless transceiver coupled to the at least one antenna, and a processor and an associated memory coupled to the at least one wireless transceiver.

The processor may store the secondary NEN in the memory. The processor may also randomly select the secondary NEN. The processor may also be configured to select the secondary NEN based upon a no U-turn rule.

The controller may be configured to assign each respective primary NEN based upon a class of service parameter. The controller may also be configured to assign each routing neighborhood based upon a threshold of a number of hops. At least one ground station node may be in communication with at least some of the plurality of satellite nodes. The plurality of satellite nodes may also be arranged in a plurality of different orbital planes.

Another aspect is directed to a method of satellite communication using a plurality of satellite nodes moving in respective known orbits. The method may comprise operating a controller to determine a plurality of routing neighborhoods for each satellite node based upon the known orbits, each routing neighborhood comprising a group of adjacent satellite nodes. The controller may assign a respective primary neighborhood egress node (NEN) from among the plurality of satellite nodes for each routing neighborhood. The method may include operating a given satellite node of a given satellite node routing neighborhood to reroute a failed path from a source satellite node to a destination satellite node through the given satellite neighborhood using a secondary NEN instead of a respective primary NEN.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
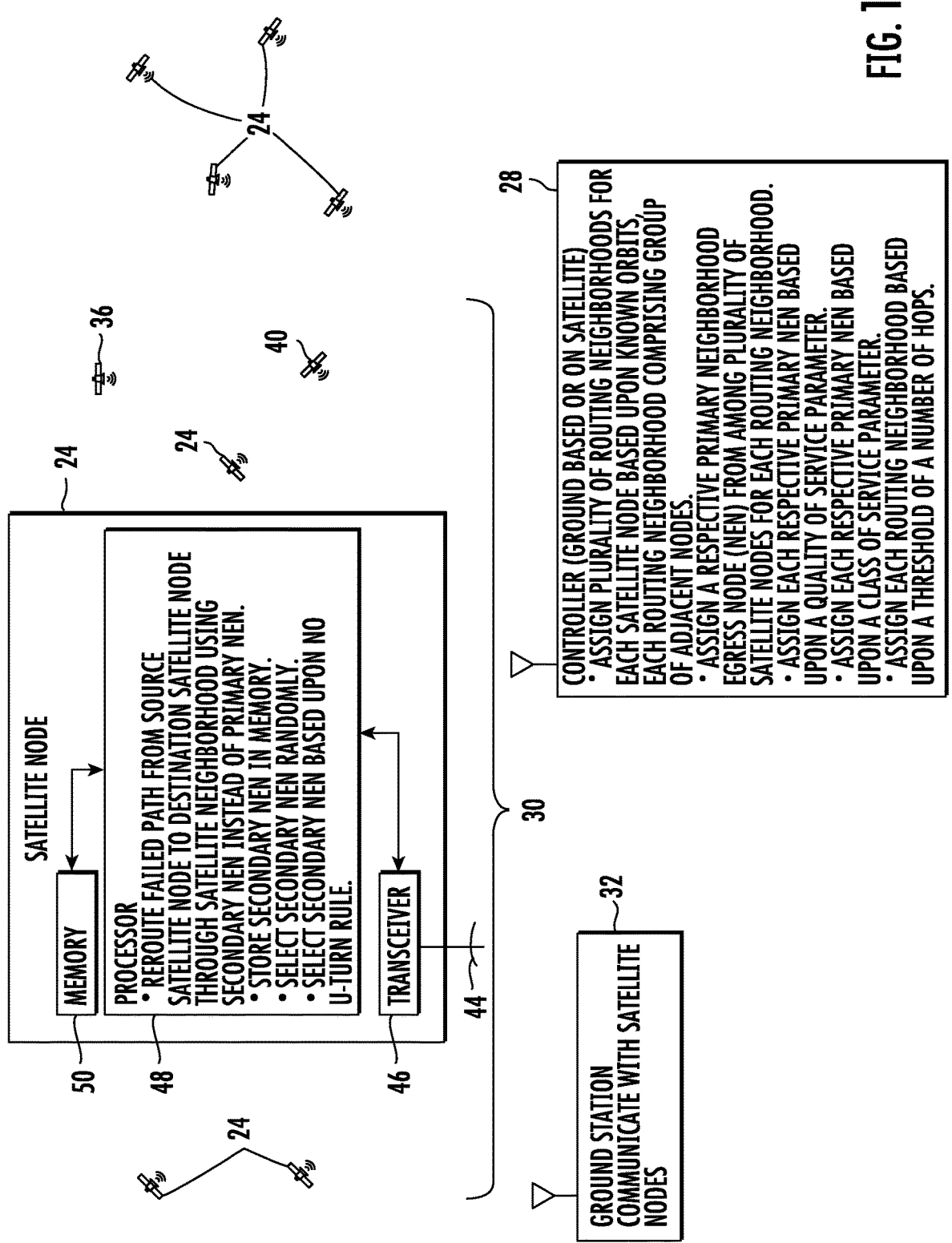
FIG. 1 is a block diagram of the satellite communication system in accordance with a non-limiting example.

Referring initially to FIG. 1, a satellite communication system is illustrated generally at 20 and shows a plurality of satellite nodes 24 that move in respective known orbits. The satellite nodes 24 may be arranged in a plurality of polar, low earth orbital (LEO) planes in this example, but the satellite communication system 20 is not limited to having the satellite nodes 24 in that LEO orbital plane. The satellite nodes 24 may be in any combination of geostationary and non-geostationary satellite orbit. Each of the satellite nodes 24, however, includes known orbits, and a central controller 28, such as located on the ground as illustrated or at a specific satellite node, may act as a master controller for the satellite communication system 20. That controller 28 may be configured to predict and determine based on the known orbits which satellites are members of a plurality of routing neighborhoods and what inter-satellite links and ground links are available in each routing neighborhood 30 (explained in greater detail below with reference to FIG. 2) for each satellite node 24 based upon the known orbits. Each routing neighborhood 30 may include a group of adjacent satellite nodes, which may be connected by inter-satellite links to some or all of the other satellites in the neighborhood 24 and each routing neighborhood may be assigned based on a threshold number of hops from one satellite node to the next satellite node or by a maximum separation or by both. Some satellite nodes 24 in a routing neighborhood 30 may be connected to a ground station node 32, but some neighborhoods may have no ground connection. Those skilled in the art will understand that as the satellites orbit and the earth rotates, the set of satellite nodes 24 comprising a routing neighborhood 30 will change over time as will which satellite nodes are to which other satellite nodes and ground nodes.

As illustrated, at least one ground station node 32 is in communication with at least some of the plurality of satellite nodes 24, and in this example, the central controller 28 may be associated with that ground station node or separate as illustrated. The satellite communication system 20 may have a plurality of ground station nodes 32 throughout the world indicative that the entire satellite communication system 20 extends over the earth's surface such that any user operating a satellite phone may communicate via the system. The central controller 28 may also be configured to assign a respective primary neighborhood egress node (NEN) 36 from among the plurality of satellite nodes 24 in the routing neighborhood 30 as the most efficient node to exit a routing neighborhood on the path to a destination node that is not in that neighborhood 24 for each routing neighborhood 30 and each such non-neighborhood destination node. The central controller 28 may be configured to assign a different primary NEN 36 for a given destination node based upon a quality of service parameter, and also in another example, assign each respective primary NEN 36 based upon a class of service parameter.

As best explained below with reference to the description of FIG. 2, a given satellite node 24 of a given satellite node routing neighborhood 30 may be configured to reroute a failed path from a source satellite node to a destination satellite node through the given satellite neighborhood using a secondary NEN 40 instead of a respective primary NEN. Each satellite node 24 may include at least one antenna 44 and at least one wireless transceiver 46 coupled to the at least one antenna and a processor 48 and an associated memory 50 coupled to the at least one wireless transceiver. The processor 48 may be configured to store the primary 36 and the secondary NEN 40 in the memory 50, or in another example, the only the primary NEN is stored and the processor randomly selects the secondary NEN when needed. The processor 48 may also be configured to select the secondary NEN 40 based upon a no U-turn rule.

The central controller 28 whether on the ground at a command base or ground station node 32 or on a satellite node 24 may be a central, quasi-static router that incorporates a detailed satellite communication model to predict when communication links will form and at what data rates. Each satellite node 24 may define a routing neighborhood 30 relative to the other satellite nodes, and in an example, the routing neighborhood may be represented by a threshold of a number of hops, such as 2 or 3 hops, by a maximum separation from the satellite node or both. These routing neighborhoods 30 create an overlapping set of routing "segments." The central controller 28 may predict the satellite nodes 24 that are members of every other routing neighborhood 30 such that each satellite node in effect may become a source satellite node for that particular routing neighborhood. The central controller 28 as a "quasi-static" router assigns a respective primary NEN 36 for each destination satellite node 24 in a final route determined by the central controller 28 for the best path from a source satellite node to the final destination node, such as in the example described with reference to FIG. 2. A table of destination satellite nodes 24 and their associated primary neighborhood egress node 36 for every routing neighborhood 30 may be uploaded to local satellite nodes 24 in their routing neighborhood 30 and may be extended to include an alternate NEN as a secondary NEN 40 instead of a respective primary NEN. As a result, a given satellite node 24 of a routing neighborhood 30 may reroute a failed path from a source satellite node to a destination satellite node via a given satellite routing neighborhood 30. In a preferred embodiment, the central controller 28 may select a plurality of primary NENs 36 for each destination node each representing a different final path through the network based on quality of service, class of service or similar service oriented criteria. In an alternate embodiment, the central controller 28 may also select a secondary NEN 40 for each destination node to include in the table. In yet another embodiment, the central controller 28 may select a plurality of both primary NENs 36 and secondary NENs 40 for each destination node based on service oriented criteria.

The source satellite node 24 that originates a packet, such as receiving the data from a ground station node 32, may use a quasi-static routing table stored in its memory 50 to determine the best available primary NEN 36 in the routing neighborhood 30 for the packet destination. A given satellite node 24 may determine the best current path to the primary NEN 36, which may be the path predicted by the central controller 28 operating as a quasi-static router. Unexpected changes or congestion in the routing neighborhood 30, however, may create a routing situation where a different path to the primary NEN needs to be determined. When the preferred primary NEN 36 in the routing neighborhood 30 is not available, then the given satellite node 24 may select an alternate satellite node as the secondary NEN 40 and the packet is routed to that secondary NEN.

In a preferred embodiment, the satellite node 24 appends a stack of intermediate node addresses that define a "tunnel" which is best path to the selected primary 36 or secondary NEN 40. In an alternate embodiment, the satellite node 24 appends the selected NEN address to the packet and each satellite node on the path to the selected NEN chooses the best next hop toward the NEN. When the packet arrives at the secondary NEN 40 (or the primary NEN 36 if there is no failed path), the secondary NEN 40 repeats the process of tunneling the packet to the next primary NEN 36 on the path to its final destination. This process is repeated until the packet arrives at its final destination. Using this tunneling approach, it is possible to reroute packets around faults and failures, without causing routing loops by exploiting strictly local routing neighborhoods 30 and knowledge about the topology of the satellite nodes 24 that make up the satellite communication system 20. The no U-turn rule is imposed when a secondary NEN 40 is selected, instead of a primary NEN, to prevent U-turns back to the origin satellite node, which could be the last primary NEN 36. In an extreme case, if a satellite node 24 determines that the destination cannot be reached through any possible NEN in its neighborhood, the packet processor may disposition the packet using disruption tolerant networking rules well known in the art.

Because the respective satellite nodes 24 in a routing neighborhood 30 use the topology information from their own routing neighborhood, each satellite node within a routing neighborhood may exploit the local neighborhood connection information available at the data link control layer (also called the link layer) level to determine what satellite links may be currently available, and which nodes currently belong to a satellites routing neighborhood. This link layer assisted segment routing permits more complex waveforms that have potentially more information and data related to second and higher hop connectivity within the routing neighborhood and allows more instantaneous data rates. There is no requirement for the higher routing or network layer, such as controlled by the central controller 28, to learn separately the information and data related to the local routing neighborhoods 30 for a given satellite node 24, thus permitting a large overhead reduction in communication between connected satellite nodes. Because the routing neighborhoods 30 of the satellite communication system 20 are small, any topology changes, congestion and other routing problems are discovered early, allowing the local satellite node 24 in a routing neighborhood 30 to take action to reroute around problems and avoid long delays in responding to routing changes. This permits a rapid rerouting technique that avoids routing loops and only requires knowledge of the local topology.

Figure 2:
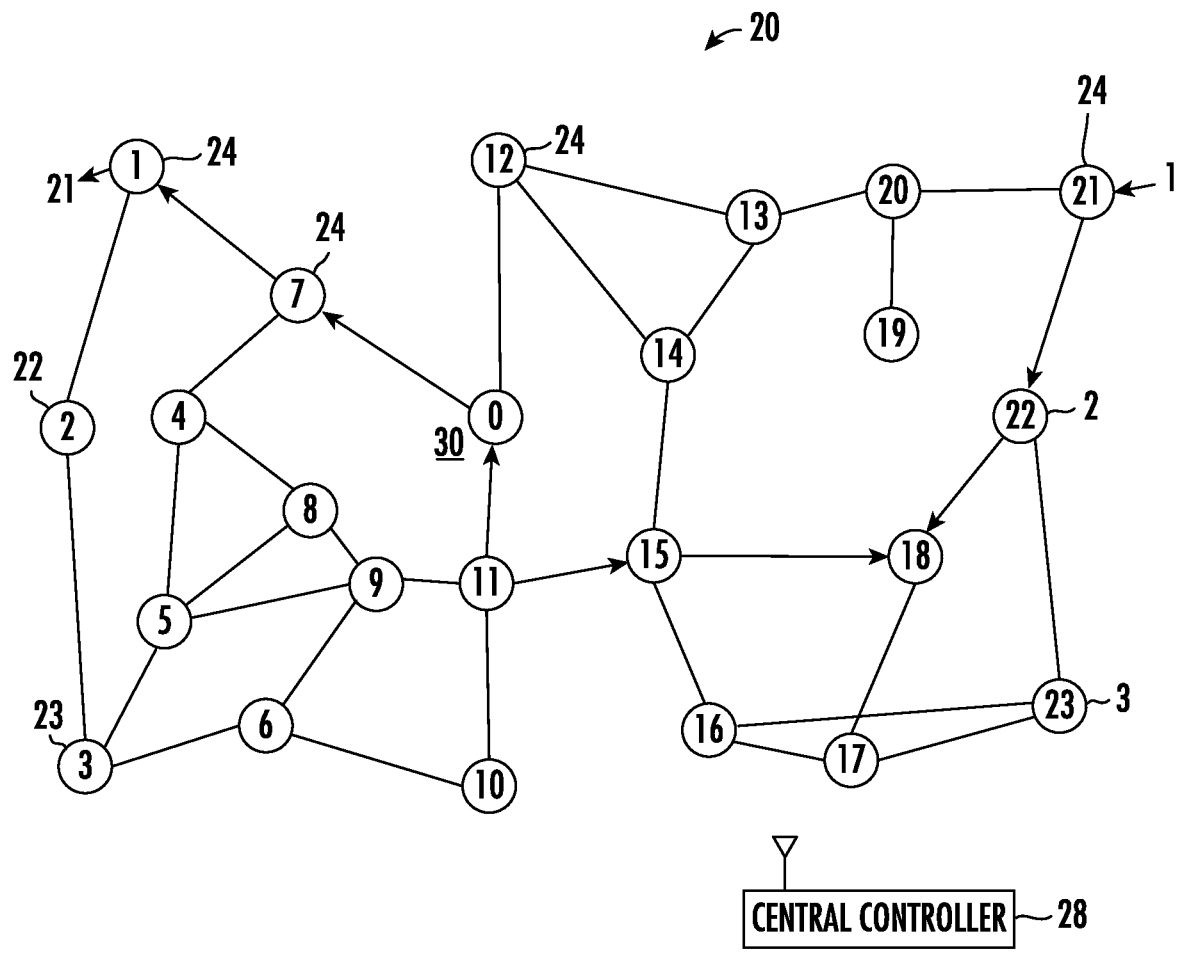
FIG. 2 is a schematic view of the satellite nodes of the satellite communication system in FIG. 1 showing example routing paths.

Referring now to FIG. 2, there is illustrated a high-level satellite node 24 diagram of the satellite communication system 20 showing a plurality of satellite nodes as numbered ovals with interconnected lines signifying potential communication links. The satellite nodes 24 may move in respective known orbits. The satellite nodes 24 are schematically shown as the numbered ovals with numbers ranging from 0 to 33. In this description of FIG. 2, satellite nodes 24 may be referred to as a node followed by the corresponding number in the oval. In this example, node 0 may be a source satellite node. Each indicated satellite node 24 may have a unique routing neighborhood 30 associated with each particular satellite node, which may be configured and determined by each respective satellite node. In this example, the routing neighborhood indicated by 30 has node 0 as the source satellite node 24.

For example, a simple waveform that the satellite node 24 generates may deduce two hop neighborhoods from direct connections, while an ad-hoc multiple access waveform may generally discover a more complete routing neighborhood topology, including all satellite nodes 24 within radio range of that particular satellite node. Each local routing neighborhood 30 associated with a particular satellite node 24 may be a routing "sector." For example, on the diagram of FIG. 2, satellite node 0 may have local neighborhood of satellite nodes 24 in its routing neighborhood 30, e.g., moving counter-clockwise, nodes 1, 7, 8, 9, 11, 15, 18, 14, and 12 are neighborhood satellite nodes for node 0's routing neighborhood A routing path 30 could be defined by the central controller 28 (central router) as a primary path from node 0 to node 22 to include satellite nodes 0, 11, 15, 18 and 22 as four hops, where node 18 as the last node on that path in node 0's routing neighborhood and is therefore the primary neighborhood egress node for destination node 22 from node 0, while the next shortest path from node 0 to node 22 includes nodes 0, 12, 14, 15, 18 and 22 as five hops, but this defined path has the same primary neighborhood egress node 18 as the primary NEN 36. However, upon a failed path, the local satellite node 24 as node 0 reroutes with a secondary path having a secondary NEN 40, but the new path corresponds to nodes 0, 7, 1, 21, 22, 18 and having 5 hops.

In an example, starting from node 0 as the origin or source satellite node 24, the final destination is node 22. The origin satellite node 0 may store information that the primary neighborhood egress nodes 36 is node 18, and node 16 is another egress node. In the nominal case of this example, the system operates as predicted by the system model at the controller 28, and node 0 may tunnel the packet to NEN node 18 via nodes 0, 11, 15, and 18. When the packet arrives at node 18, node 18 may recognize that the destination node, node 22 is in node 18's routing neighborhood, and node 18 may tunnel the packet to node 22.

In another case of this example, both nodes 18 and 16 are isolated when node 15 fails. Node 18 is the primary neighborhood egress node 36 for destination node 22. Node 0 may receive data from the link layer indicating that all links to node 15 are unavailable and therefore node 18 cannot be reached. The local memory 50 for satellite node 0 may have stored a quasi-static routing table for this time period indicating that satellite node 22 may have a primary neighborhood egress node 36 as node 18, and a secondary neighborhood egress node 40 as node 1, and thus, the satellite communication system 20 may tunnel the packet to node 1 via nodes 0, 7 and 1. The satellite node 22 may be an member of the of the satellite node 1 routing neighborhood 30 and that satellite node 1 may tunnel the packets to node 22 via nodes 1, 21 and 22.

In a another example, a packet arrives at satellite node 0 with destination node 18 and node 0 forwards the packet on the nominal tunnel to node 18 (e.g., 0, 11, 15, 18) before the link layer alerts node 0 that node 15 is unavailable. When the packet arrives at node 11 for destination node 18, node 11 may determine from its link layer that the egress node 15 has failed, which interrupts the tunnel to node 18 and for that reason, responsibility for routing the packet will pass from node 0 to node 11. Node 11 as part its routing neighborhood may determine that the primary route for node 18 which is a member of node 11's routing neighborhood is through node 15 which is unreachable and which also isolates node 16 and node 14. Node 11 may reroute the failed path using information received from the link layer and stored in its memory 50 and determine a new secondary neighborhood egress node 40 for node 18 as node 7, and node 11 would tunnel to node 7 in the order of nodes 11, 0, and 7. Node 7 may not be able to determine that node 15 has failed because it is not in Node 7's routing neighborhood, and the node 7 memory 50 storing the routing table for the destination node 18 would have stored data that the primary neighborhood egress node 36 is node 11 and a secondary neighborhood egress node 40 is node 22. The no U-turn rule will prevent the packet returning to node 11, which was the source of the tunnel to node 7. As a result, node 7 may tunnel to node 22 in the order of node 1, 2 and 22.

In this example, node 22 has not determined that node 15 failed. Node 22 may have in its memory 50 a forwarding table for destination node 18, with the primary neighborhood egress node 36 being node 18 and a secondary neighborhood egress node 40 being node 17, and node 22 may transmit packets to node 18.

Generally, a particular satellite node 24 includes its processor 48 and associated memory 50 to hold data regarding routing tables as determined by the central controller 28, and if the final destination node is in the routing neighborhood 30 of that particular satellite node, then the table entry in the memory corresponds to that destination node. When class of service routing or quality of service routing is supported, the memory 50 will identify an egress node for each "forwarding equivalent class," but if the quality of service or class of service is not supported, the memory may have one neighborhood egress node entry for each destination.

Quality of service manages network resources by allocating applications of different behaviors to different traffic types. Quality of service is usually implemented at the layer 3 of the OSI model that manages network resources. Traffic is managed by allocating application of different network behaviors to different traffic types and shapes, and prioritizes traffic by determining which traffic should be given priority over other traffic. Class of service usually operates at layer 2 of the OSI model and manages different types of traffic over the network 20. The class of service prioritizes traffic by allocating different levels of priority to different groups. Class of service enables network managers to refine connections. For example, class of service operations may include different queues for different priority packets. Unlike quality of service traffic management, class of service does not ensure network performance or guarantee priority in delivering packets.

Each satellite node 24 may update local routing tables within its memory 50 for its routing neighborhood 30 whenever that particular satellite node detects a change in the routing neighborhood 30 connectivity or membership. When a final destination node is in a local routing neighborhood 30 for a satellite node 24, then the tunnel to that destination node is followed using the local routing tables at the source satellite node in the routing neighborhood. If the final destination node is not in the routing neighborhood 30, the shortest local routing path to the primary neighborhood egress node 36 identified in the memory 50 of that source satellite node 24 is used. When a packet arrives at a primary neighborhood egress node 36 after transitioning a tunnel from the local satellite node 24 as part of the routing neighborhood, the primary neighborhood egress node becomes the next local satellite node and that new local satellite node decides where to tunnel the packet to the next established primary neighborhood egress node. The primary neighborhood egress node 36 which becomes the new local satellite node 24 enforces the no U-turn rule, and this no U-turn rule prevents a new local satellite node from tunneling the packet back to the old local satellite node. The tunnel protocol of the respective satellite nodes 24 in a routing neighborhood 30 informs the primary neighborhood egress node 36 of the identity of a local node to tunnel the packet as the primary neighborhood egress node to prevent U-turns.

Figures 3, 4:
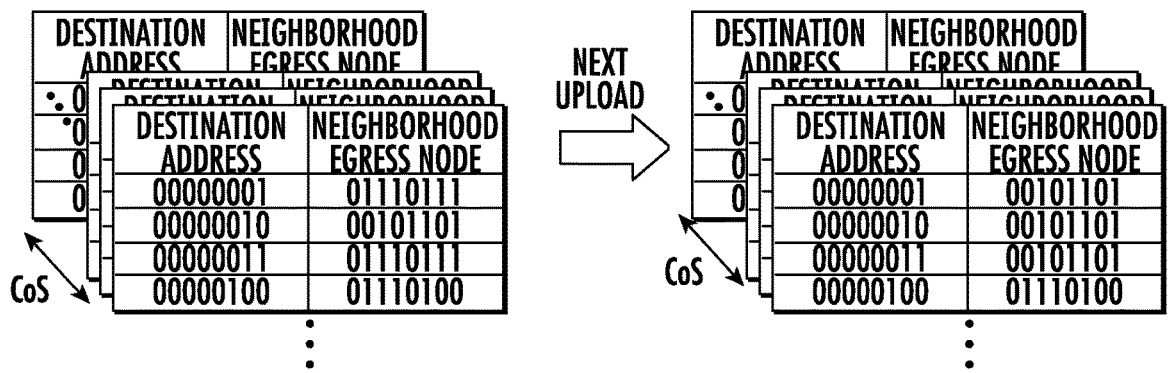
FIG. 3 is an example of a forwarding table having incremental updates for a satellite node to minimize the load on the satellite communication system of FIG. 1.
FIG. 4 is a table showing different packet address formats that may be used for the satellite nodes in the satellite communication system of FIG. 1.

Referring now to the table of FIG. 3, example routing table updates are illustrated for primary neighborhood egress nodes 36 to minimize the network load imposed by the different updates. It may be assumed that every forwarding table contains a destination address for every reachable satellite node 24 in the satellite communication system 20. To address these satellite nodes 24, data is included for a forwarding entry from the local satellite node toward the destination satellite node for every class of service (CoS) forwarding equivalent class, where said forwarding entry is the address of a primary NEN 36, and in an alternate embodiment, the table also includes a secondary NEN 40.

For example, the table illustrates that other path optimization parameters besides simple distance metrics may be used. Destination addresses and neighborhood egress nodes are shown on the left-hand side. As the earth rotates and the satellites move in their known orbits, the optimum choice of the NEN form a given satellite node 24 to a given destination node, as selected by the central controller, may change and the forwarding table entry for that destination must be updated accordingly. The table updates are shown on the right-hand side and indicates the destination address and new neighborhood egress node in lines 1 and 3. A table update is sent from the central controller 28 to a satellite node when the central controller predicts that the optimum NEN for some destination node from that satellite node will change at some time in the future. The central controller 28 time tags the update to indicate when the satellite should replace a current table entry with an updated table entry. Class of services is shown for each of the respective tables with the front table showing example destination addresses and neighborhoods egress nodes for that particular class of service.

Referring now to FIG. 4, a table is illustrated showing different packet address formats that may be used for the satellite nodes 24 in the satellite communication system 20 shown in FIG. 1. Standard addressing schemes may be used to limit the additional network loading and minimize overhead penalty. For example, the table shows the uplink size for several candidate standard addresses. The tables show several address schemes for a) custom format; b) an Ethernet MAC without OUI; c) full Ethernet MAC; d) IPv4; and e) IPv5. The different column examples are categorized as: 1) bytes per quasi-static table entry; 2) network load for the quasi-static routing (QSR) per day; 3) the average QSR data rate; and 4) the 5 minute ground pass QSR data rate for a satellite node 24. None of these examples represents an excess of load on the satellite communication network 20 capacity, and thus, indicates that these different addressing schemes are possible.

Figure 5:
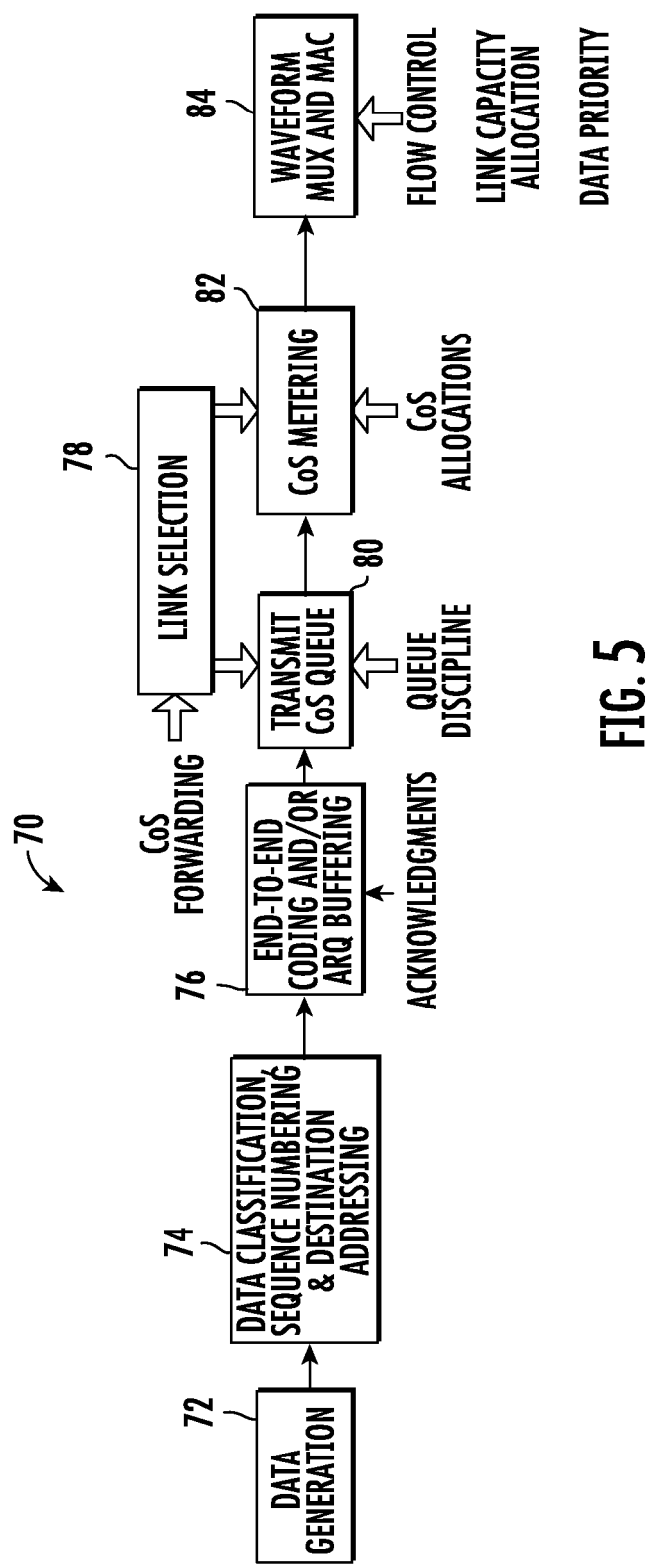
FIG. 5 is block diagram showing a flow sequence based upon class of service at a source satellite node.
Figure 6:
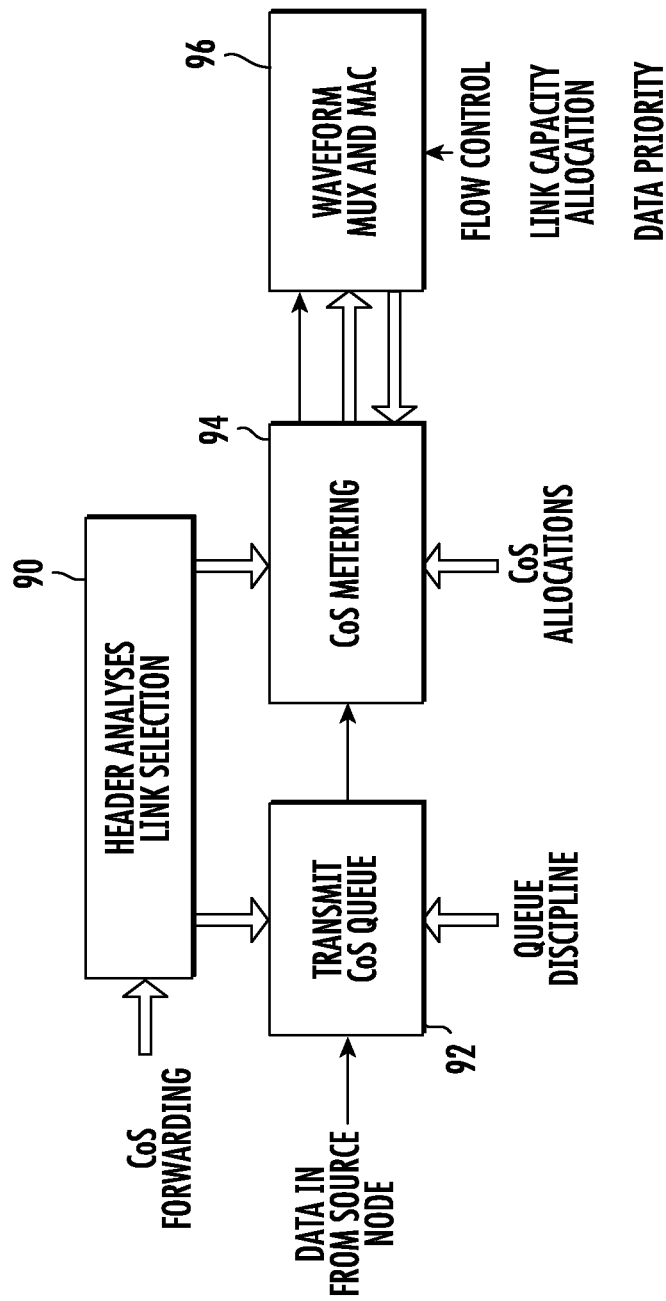
FIG. 6 is a block diagram showing a flow sequence for an intermediary satellite node in a routing neighborhood for the class of service as applied to the source satellite node in FIG. 5.

Transport services may be provided at each satellite node 24. The block diagrams of FIGS. 5 and 6 show the different infrastructure functions for a source satellite node 24 in a routing neighborhood 30 (FIG. 5), and an intermediary satellite node in the same routing neighborhood (FIG. 6). As shown generally at 70 in FIG. 5, the class of service information is forwarded and data generation 72 occurs at the source satellite node 24 as part of the routing neighborhood 30, followed by data classification, sequence numbering, and destination addressing 74 for the packet, and end-to-end coding and/or ARQ buffering 76 with entered acknowledgments. The class of service forwarding is passed to the link selection function 78 in which the transmit class of service queue 80 holds data pursuant to the class of service and queue rules (que discipline) taken into consideration and passes the data to a class of service metering function 82 with various class of service allocations taken into consideration, followed by waveform multiplexing (MUX) and media access control (MAC) 84 with flow control, link capacity allocation, and data priority taken into consideration.

At the intermediate satellite node 24 as part of the same routing neighborhood 30 shown in FIG. 6, the class of service information is forwarded and that satellite node will perform a header analysis for link selection 90 of another satellite node as part of the routing neighborhood towards a primary neighborhood egress node 36. Similar to the source satellite node 24 is the transmit class of service queue 92 and class of service metering 94 and the waveform multiplexing (MUX) and media access control (MAC) 96 that may include flow control, link capacity allocation and data priority considerations.

Each routing neighborhood 30 is usually 2 or 3 hops long, but can vary, and routing neighborhoods may include longer hops of 5 or 6 hops. The satellite communication system 20 may operate as a partial mesh network in which some of the routing neighborhoods 30 are sub-networks, and some satellite nodes 24 may include limited star, relay or point-to-point connectivity with other satellite nodes. The central controller 28 may be positioned at the earth's surface as a local earth station or contained in a satellite as a separate satellite or part of the communication system 20 as a satellite node 24.

Because each routing neighborhood 30 defines a routing segment, every satellite node 24 has its own link layer neighborhood as a routing neighborhood and the routing segments are overlapping. Thus, in the satellite communication system 20, each satellite node 24 is the routing segment ingress for its routing neighborhood 30 and that satellite node may also be a source node (FIG. 5) or an intermediate node (FIG. 6). The routing neighborhood includes a primary neighborhood egress node 36, for every destination node in the communications system 20 except the ingress node, which depend entirely on the path taken through the satellite communication network 20. If the destination node is not a member of the routing neighborhood 30, then the primary NEN 36 for that destination node is also a routing segment egress node for the routing segment defined by the routing neighborhood. Only local satellite nodes 24 of a routing neighborhood 30 can be an ingress node, but every satellite node may be a local node for its particular defined routing neighborhood as established by the central controller 28 so every satellite node is potentially an ingress node. The routing neighborhoods 30 may be defined by a node separation distance, for example, a routing neighborhood boundary limit may be set at 8,000 kilometers. Any satellite nodes 24 outside that boundary are not included in that routing neighborhood 30 regardless of their hop distance from the local satellite node. In another example, the routing neighborhood 30 may be defined by the threshold number of hops, such as 2-hop or 3-hop neighborhood. In a preferred embodiment, the routing neighborhood may be defined by a node separation limit and a hop limit for example a node is a member of a neighborhood if it is within 8000 km of the local node or if it is within 2 hops of the local node.

The choice of the routing neighborhood 30 size and the number of satellite nodes 24 may be defined by a routing neighborhood and may depend on the type of waveform used by the satellite nodes. Traditional waveforms may have limited node tracking at the data link control (DLC) layer (which has been referred to as the "link layer" in the preceding) and may use a 2-hop neighborhood. Those satellite nodes 24 using a multiple-access waveform with neighborhood tracking may use an inherent neighborhood maintained by the waveform, provided that the routing neighborhood 30 is constrained to include all 2-hop neighbors.

Figure 7:
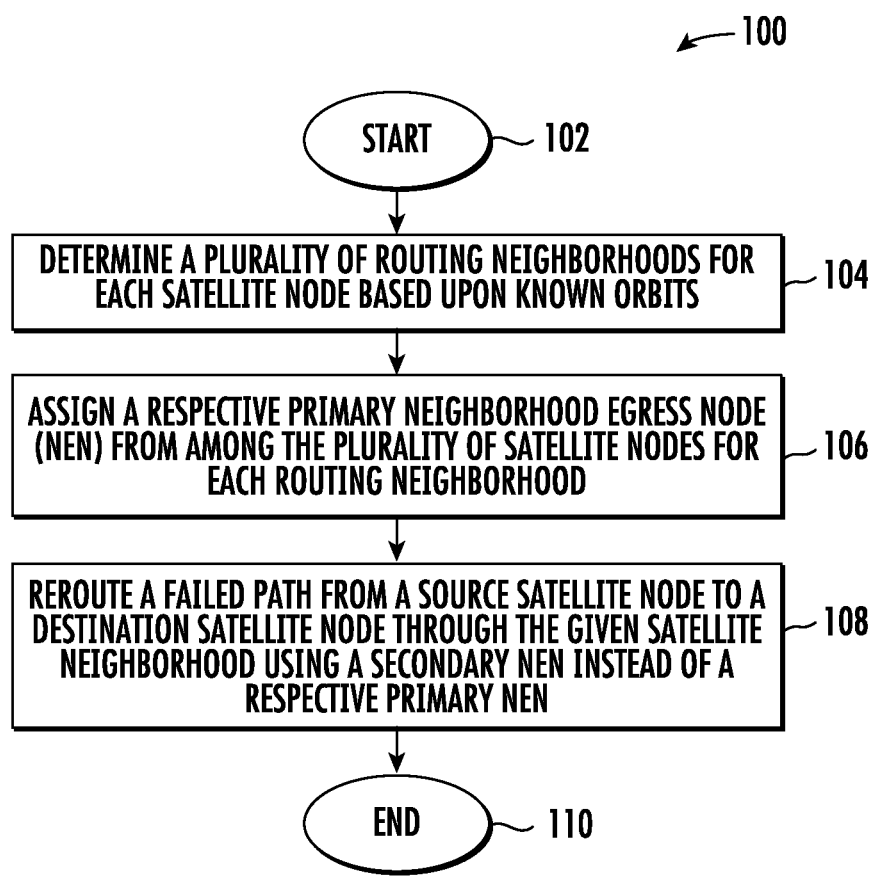
FIG. 7 is a high-level flowchart showing an example of a satellite communication using the satellite communication system shown in FIG. 1.

Referring now to the flowchart shown in FIG. 7, a method of satellite communication using a plurality of satellite nodes 24 moving in respective known orbits is shown generally at 100. The process starts (Block 102) and the controller 28 is operated to determine a plurality of routing neighborhoods 30 for each satellite node 24 based upon known orbits (Block 104). A respective primary neighborhood egress node (NEN) 36 is assigned from among a plurality of satellite nodes 24 for each routing neighborhood 30 (Block 106). The satellite node 24 of a given satellite node routing neighborhood 30 is operated to reroute a failed path from a source satellite node to a destination satellite node through the given satellite routing neighborhood 30 using a secondary NEN 40 instead of a respective primary NEN 36 (Block 108). The process ends (Block 110).

Figure 8:
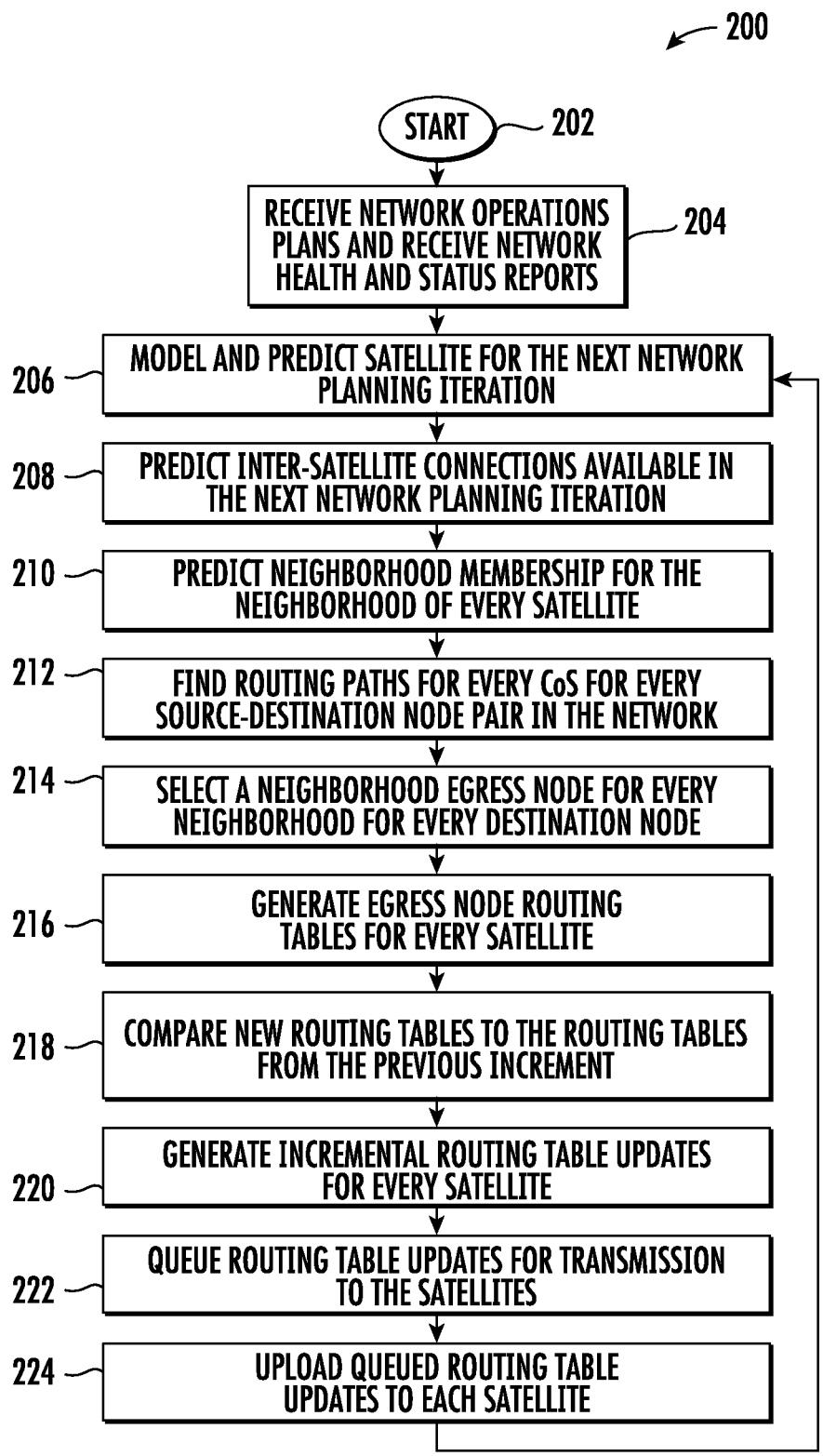
FIG. 8 is a flowchart showing the quasi-static routing process flow at the controller.

Referring now to FIG. 8, there is illustrated generally at 200 a flowchart showing the quasi-static routing process flow at the controller 28. The process starts (Block 202) and network operations plans and network health and status reports are received (Block 204). The satellite for the next network planning iteration is modeled and predicted (Block 206) and inter-satellite connections available in the next network planning iteration are predicted (Block 208). The neighborhood membership for the neighborhood of every satellite is predicted (Block 210). Routing paths for every class service for every source destination pair in the network are found (Block 212). A neighborhood egress node for every neighborhood for a source destination route is selected (Block 214). An egress node is generated for routing tables for every satellite node (Block 216). New routing tables are compared to the routing tables from the previous increment (Block 218). Incremental routing table updates are generated for every satellite node (Block 220). Routing table updates for transmission to the satellites are queued (Block 222) and the queued routing table updates to each satellite are uploaded (Block 224).

Figure 9:
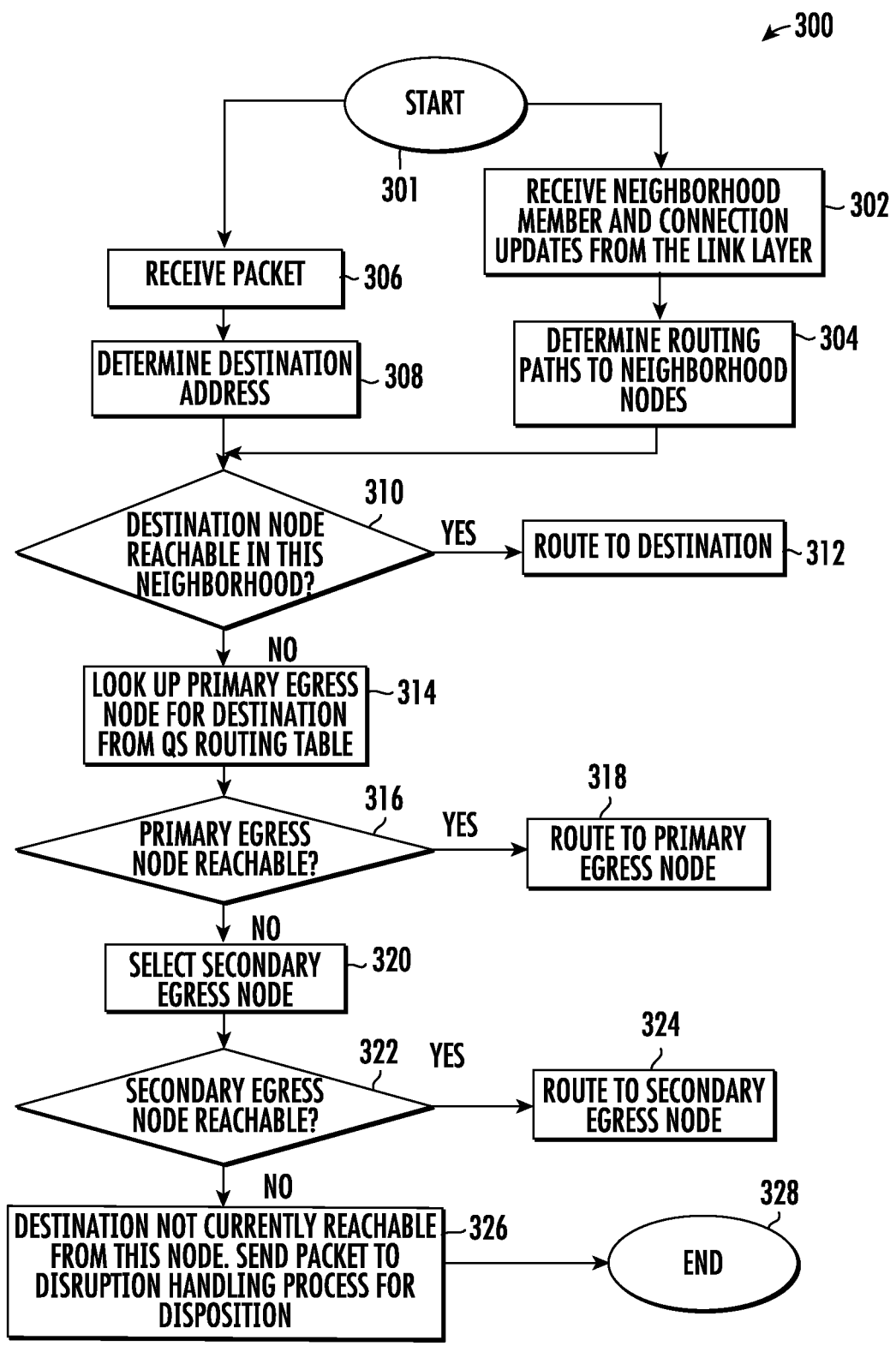
FIG. 9 is a flowchart showing the link layer assisted segment routing flow at the satellite.

Referring now to FIG. 9, a flowchart showing the link layer assisted segment routing flow at the satellite is illustrated generally at 300. The process starts (Block 301) and receives neighborhood member and connection updates from the link layer (Block 302) and the routing paths to neighborhood nodes are determined (Block 304). At the same time, a packet is received (Block 306) and destination address determined (Block 308). A determination is made if the destination node is reachable in this neighborhood (Block 310) based on steps 304, 308, and if yes, it is routed to destination (Block 312). If no, then the process looks up the primary egress node for the destination from the quasi-static routing table (Block 314). A determination is made if the primary egress node is reachable (Block 316), and if yes, it is routed to primary egress node (Block 318). If not, the secondary egress node is selected (Block 320). A determination is then made whether the secondary egress node is reachable (Block 322), and if yes, it is routed to the secondary egress node (Block 324). If not and the destination is not currently reachable from this node, the packet is sent to the disruption handling process for disposition (Block 326). The process ends (Block 328).

Figure 10:
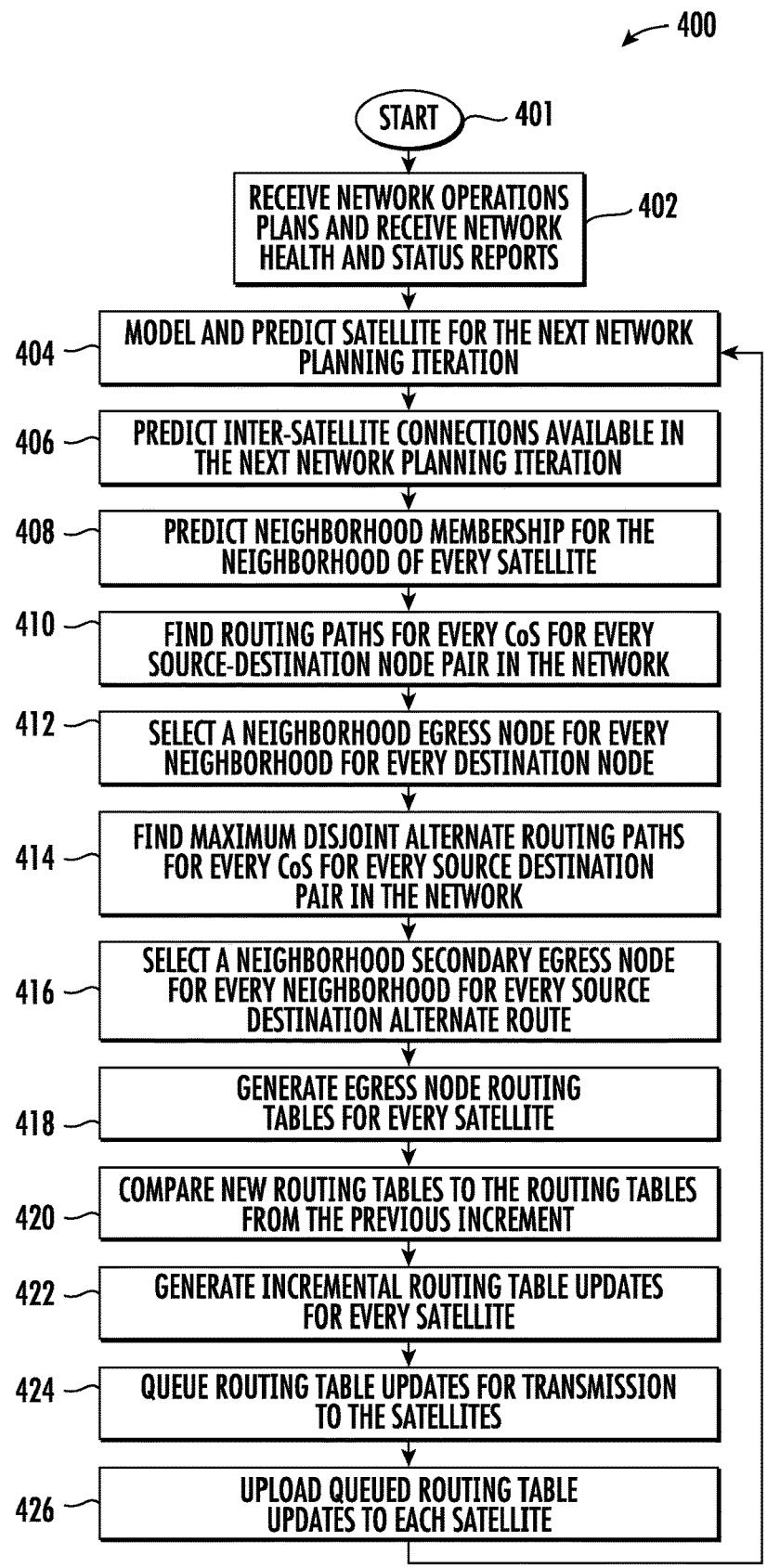
FIG. 10 is a flowchart showing an alternative of the quasi-static routing process flow at the controller.

Referring now to FIG. 10, there is illustrated generally at 400 a flowchart showing an alternative quasi-static routing process flow at the controller 28. The process starts (Block 401). Network operations plans and network health and status reports are received (Block 402). The satellite for the next network planning iteration is modeled and predicted (Block 404) and inter-satellite connections available in the next network planning iteration are predicted (Block 406). The neighborhood membership for the neighborhood of every satellite is predicted (Block 408) and the routing paths for every class of service for every source-destination node pair in the network is found (Block 410).

A neighborhood egress node for every neighborhood for every destination node is selected (Block 412) and a maximum disjoint alternate routing path for every class of service for every source destination pair in the network is found (Block 414). A neighborhood secondary egress node for every neighborhood for every source destination alternate route is selected (Block 416). An egress node routing table for every satellite is generated (Block 418). New routing tables to the routing tables from the previous increment are compared (Block 420). The incremental routing table updates for every satellite are generated (Block 422). Routing table updates for transmission to the satellite are queued (Block 424) and the queued routing table updates to each satellite are uploaded (Block 426).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A satellite communication system comprising:
   a plurality of satellite nodes moving in respective known orbits; and
   a controller configured to
      determine a plurality of routing neighborhoods for each satellite node based upon the known orbits, each routing neighborhood comprising a group of adjacent satellite nodes, and
      assign a respective primary neighborhood egress node (NEN) from among the plurality of satellite nodes for each routing neighborhood;
   a given satellite node of a given satellite node routing neighborhood configured to reroute a failed path from a source satellite node to a destination satellite node through the given satellite neighborhood using a secondary NEN instead of a respective primary NEN.

2. The satellite communication system of claim 1 wherein each satellite node comprises:
   at least one antenna;
   at least one wireless transceiver coupled to the at least one antenna; and
   a processor and an associated memory coupled to the at least one wireless transceiver.

3. The satellite communication system of claim 2 wherein the processor stores the secondary NEN in the memory.

4. The satellite communication system of claim 2 wherein the processor randomly selects the secondary NEN.

5. The satellite communication system of claim 2 wherein the processor is configured to select the secondary NEN based upon a no U-turn rule.

6. The satellite communication system of claim 1 wherein the controller is configured to assign each respective primary NEN based upon a quality of service parameter.

7. The satellite communication system of claim 1 wherein the controller is configured to assign each respective primary NEN based upon a class of service parameter.

8. The satellite communication system of claim 1 wherein the controller is configured to assign each routing neighborhood based upon a threshold number of hops.

9. The satellite communication system of claim 1 comprising at least one ground station node in communication with at least some of the plurality of satellite nodes.

10. The satellite communication system of claim 1 wherein the plurality of satellite nodes are arranged in a plurality of different orbital planes.

11. A satellite communication system comprising:
    a plurality of satellite nodes moving in respective known orbits in a plurality of low Earth orbital planes, each satellite node comprising
       at least one antenna,
       at least one wireless transceiver coupled to the at least one antenna, and
       a processor and an associated memory coupled to the at least one wireless transceiver; and
    a controller configured to
       determine a plurality of routing neighborhoods for each satellite node based upon the known orbits, each routing neighborhood comprising a group of adjacent satellite nodes, and
       assign a respective primary neighborhood egress node (NEN) from among the plurality of satellite nodes for each routing neighborhood;
    a given satellite node of a given satellite node routing neighborhood configured to reroute a failed path from a source satellite node to a destination satellite node through the given satellite neighborhood using a secondary NEN instead of a respective primary NEN.

12. The satellite communication system of claim 11 wherein the processor stores the secondary NEN in the memory.

13. The satellite communication system of claim 11 wherein the processor randomly selects the secondary NEN.

14. The satellite communication system of claim 11 wherein the processor is configured to select the secondary NEN based upon a no U-turn rule.

15. The satellite communication system of claim 11 wherein the controller is configured to assign each respective primary NEN based upon a quality of service parameter.

16. The satellite communication system of claim 11 wherein the controller is configured to assign each respective primary NEN based upon a class of service parameter.

17. The satellite communication system of claim 11 wherein the controller is configured to assign each routing neighborhood based upon a threshold number of hops.

18. The satellite communication system of claim 11 comprising at least one ground station node in communication with at least some of the plurality of satellite nodes.

19. A method of satellite communication using a plurality of satellite nodes moving in respective known orbits, the method comprising:
   operating a controller to
      determine a plurality of routing neighborhoods for each satellite node based upon the known orbits, each routing neighborhood comprising a group of adjacent satellite nodes, and
      assign a respective primary neighborhood egress node (NEN) from among the plurality of satellite nodes for each routing neighborhood; and
   operating a given satellite node of a given satellite node routing neighborhood to reroute a failed path from a source satellite node to a destination satellite node through the given satellite neighborhood using a secondary NEN instead of a respective primary NEN.

20. The method of claim 19 wherein each satellite node comprises at least one antenna, at least one wireless transceiver coupled to the at least one antenna, and a processor and an associated memory coupled to the at least one wireless transceiver; and comprising operating the processor to store the secondary NEN in the memory.

21. The method of claim 19 wherein each satellite node comprises at least one antenna, at least one wireless transceiver coupled to the at least one antenna, and a processor and an associated memory coupled to the at least one wireless transceiver; and comprising operating the processor to randomly select the secondary NEN.

22. The method of claim 19 comprising operating the given satellite node to select the secondary NEN based upon a no U-turn rule.

\* \* \* \* \*